(12) United States Patent
Mittelbach

(10) Patent No.: US 11,761,519 B2
(45) Date of Patent: Sep. 19, 2023

(54) LINEAR DRIVE, LONGITUDINAL ADJUSTMENT DEVICE OF A SEAT, AND MOTOR VEHICLE

(71) Applicant: IMS GEAR SE & CO. KGAA, Donaueschingen (DE)

(72) Inventor: Marcel Mittelbach, Schluchsee (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 17/878,444

(22) Filed: Aug. 1, 2022

(65) Prior Publication Data
US 2023/0049563 A1 Feb. 16, 2023

(30) Foreign Application Priority Data

Aug. 3, 2021 (EP) .................................... 21189451

(51) Int. Cl.
*F16H 19/04* (2006.01)
*F16H 25/12* (2006.01)
(Continued)

(52) U.S. Cl.
CPC ............. *F16H 25/12* (2013.01); *B60N 2/067* (2013.01); *F16H 19/04* (2013.01); *F16H 19/043* (2013.01); *F16H 25/02* (2013.01)

(58) Field of Classification Search
CPC ........ F16H 25/12; F16H 25/125; F16H 19/04; F16H 19/043; F16H 25/02; B60N 2/067
See application file for complete search history.

(56) References Cited

U.S. PATENT DOCUMENTS 5,187,994 A * 2/1993 Hirai .................. F16H 25/02
74/120
5,207,473 A * 5/1993 Nawa .................. B60N 2/067
296/65.15
(Continued)

FOREIGN PATENT DOCUMENTS

CN 106523632 A * 3/2017 ........... F16H 19/043
DE 2360312 A1 6/1975
(Continued)

OTHER PUBLICATIONS

Search Report dated Jan. 25, 2022, in corresponding European application No. 21189451.4.

*Primary Examiner* — Gregory Robert Weber
(74) *Attorney, Agent, or Firm* — Nath, Goldberg & Meyer; Jerald L. Meyer; Morgan D. Rosenberg

(57) ABSTRACT

A linear drive has at least one rack which is arranged along a longitudinal axis and has a plurality of teeth, a drive shaft arranged in a transverse axis transversely to the longitudinal axis, and at least two propulsion elements, each having at least one propulsion tooth. The at least two propulsion elements are linearly movable in a stroke axis which is oriented transversely to the longitudinal axis and transversely to the drive shaft. The at least two propulsion elements are drivingly coupled to the drive shaft in such a manner that the at least two propulsion elements perform at least one cyclical stroke movement in the course of one rotation of the drive shaft and enter and exit the at least one rack to generate a propulsion in the longitudinal axis. The at least two propulsion elements enter and exit the at least one rack with a phase shift.

26 Claims, 7 Drawing Sheets

(51) Int. Cl.
*B60N 2/06* (2006.01)
*F16H 25/02* (2006.01)

(56) References Cited

U.S. PATENT DOCUMENTS

| | | | | |
|---|---|---|---|---|
| 5,351,572 A | * | 10/1994 | Vortmeyer | F16H 19/043 280/775 |
| 5,477,741 A | * | 12/1995 | Takenaka | F16H 25/02 310/156.08 |
| 5,582,068 A | * | 12/1996 | Fukui | F16H 25/02 29/564 |
| 5,626,055 A | * | 5/1997 | Fukui | F16H 19/043 477/9 |
| 5,806,369 A | * | 9/1998 | Takenaka | F16H 25/08 74/116 |
| 5,823,050 A | * | 10/1998 | Takenaka | F16H 25/08 74/116 |
| 9,726,152 B2 | * | 8/2017 | Nohara | F03D 15/00 |
| 9,790,920 B2 | * | 10/2017 | Nohara | F16H 25/02 |

FOREIGN PATENT DOCUMENTS

| | | | | |
|---|---|---|---|---|
| EP | 0482827 | B1 | 6/1994 | |
| EP | 0612935 | B1 | 8/1994 | |
| EP | 612936 | A1 * | 8/1994 | ......... F16H 19/043 |
| EP | 879976 | A1 * | 11/1998 | ............ B23Q 1/58 |
| GB | 2054794 | A | 2/1981 | |
| WO | 2009/134169 | A2 | 11/2009 | |
| WO | 2020/245255 | A1 | 12/2020 | |

\* cited by examiner

LINEAR DRIVE, LONGITUDINAL ADJUSTMENT DEVICE OF A SEAT, AND MOTOR VEHICLE

BACKGROUND

1. Field

The present invention relates to a linear drive, to a longitudinal adjustment device for a seat, and to a motor vehicle.

2. Description of the Related Art

Linear drives are known from the prior art in various designs and are commonly used as longitudinal seat adjustment devices for adjusting the position of a seat in motor vehicles. Longitudinal seat adjustment devices typically interact with a lower rail fixed to a chassis and an upper rail arranged within it, the upper rail being motorized by means of the linear drive. The adjustment of the upper rail by linear drives is typically carried out in the prior art by means of a spindle which is arranged within the upper rail and is supported in each case at its first end and second end.

Such longitudinal seat adjustment devices are known, for example, from DE 36 40 197 A1, DE 42 08 948 C2, DE 196 42 655 C2, DE 198 15 283 A1, DE 10 2004 013 009 A1, and DE 10 2006 052 936 A1.

Due to the high demands placed on a linear drive, which in addition to the adjustment function in the longitudinal seat adjustment device must also ensure accident safety, such linear drives have different types of design requiring different production methods and processes. It has been shown that a play-free linear movement can be realized only with effort and that breaking loads can be adapted only with effort. It should also be mentioned that longitudinal seat adjustment devices should adjust a seat in a motor vehicle as quietly as possible in order to increase comfort.

SUMMARY

This is where the present invention starts.

The object of the invention is to propose an improved linear drive which expediently improves the linear drives known from the prior art. Furthermore, the linear drive is intended to have a particularly compact design and to enable a linear movement with as little play as possible at the same time as a variable and adaptable break load. The linear drive is also intended to enable a high adjustment speed.

This object is achieved by a linear drive having the features of claim 1, a longitudinal seat adjustment device having the features of claim 24, and with a motor vehicle having the features of claim 25.

Further advantageous designs of the invention are specified in the dependent claims.

The linear drive according to the invention having the features of claim 1 has at least one rack which is arranged along a longitudinal axis and has a plurality of preferably equally distributed teeth. In addition, the linear drive according to the invention has a drive shaft arranged in a transverse axis transversely to the longitudinal axis, and at least two propulsion elements, each having at least one propulsion tooth, wherein the at least two propulsion elements are linearly movable in a stroke axis which is oriented transversely to the longitudinal axis and transversely to the drive shaft. The at least two propulsion elements are also drivingly coupled to the drive shaft in such a way that the at least two propulsion elements perform at least one cyclical stroke movement in the course of one rotation of the drive shaft and enter and exit the at least one rack to generate propulsion in the longitudinal axis, and wherein the at least two propulsion elements enter and exit the at least one rack with a phase shift.

Here and in the following, a cyclical stroke movement is understood to mean a sequence of movements of the particular propulsion element, in which the propulsion element enters the rack once from a starting point and completely exits the rack once and returns to the starting point and vice versa. Each propulsion element can go through one or more complete periods or cycles during one rotation of the drive shaft, the number of periods or cycles always being an integer.

When each propulsion element or the at least one propulsion tooth thereof enters the rack, the teeth and the at least one propulsion tooth come into operative contact, resulting in a propulsion in the longitudinal axis. For this purpose, each propulsion tooth enters the rack or a tooth space between two teeth of the rack, and the propulsion tooth and the tooth of the rack come into operative contact at so-called friction surfaces, resulting in the propulsion. To this end, it is necessary for at least the teeth and/or the propulsion teeth to have corresponding friction surfaces that can be formed in the manner of a wedge surface.

It is further noted that, in connection with the present invention, a phase shift is understood to mean an entering and exiting of the at least two propulsion elements into or out of the rack at different angles of rotation of the drive shaft.

The present invention is based on the concept of proposing a linear drive, the drive shaft of which is arranged transversely to the longitudinal axis of the rack, which means that the use of the proposed linear drive for longitudinal seat adjustment devices is particularly favorable, since two linear drives can be operated in parallel with one another with a single drive without the need for additional gear units or transmissions. Furthermore, the proposed linear drive can have a particularly compact design and can also be designed without play and have a high break load.

In addition, it has proven to be advantageous if the linear drive has more than two propulsion elements, with four, six, or eight propulsion elements being preferable. It is also noted that the number of propulsion elements does not have to be even, nor is there an upper limit to their number.

According to an advantageous embodiment of the linear drive according to the invention, the phase shift of the cyclical stroke movement of the at least two propulsion teeth in relation to a rotation $\varphi$ of the drive shaft is at least $1/256 \, \varphi$, further preferably at least $1/128 \, \varphi$, $1/64 \, \varphi$, $1/32 \, \varphi$, $1/16 \, \varphi$, or $1/8 \, \varphi$ and is preferably less than or equal to $1/2 \, \varphi$. The phase shift is preferably less than $1/2 \, \varphi$, in particular $1/3 \, \varphi$ or $1/4 \, \varphi$.

It may be advantageous if the mathematical reciprocal of the particular fraction (1/n) of the phase shift predetermines the number k of propulsion elements to be provided, specifically $k=(n/i)$, where a number i is the number of cyclical stroke movements of a propulsion element during one rotation y of the drive shaft. For example, preferably at least two propulsion elements (n=4) are to be provided if the phase shift between the propulsion elements is $1/4 \, \varphi$ and the propulsion element performs one complete cyclical movement per rotation.

According to a development of the present invention, the at least one propulsion tooth of one of the at least two propulsion elements is arranged with an offset relative to the at least one propulsion tooth of the other of the at least two propulsion elements in relation to the drive shaft in the longitudinal axis and/or the at least one tooth of the at least one rack can enter and exit one of the at least two propulsion elements and is arranged with an offset in the longitudinal axis relative to the at least one tooth of the at least one rack, which the other of the at least two propulsion elements can enter and exit. In other words, it is possible for the rack and/or the propulsion elements to have a shape adapted to the phase shift and the resulting propulsion in order in particular to use a large number of identical or structurally identical components, in particular propulsion elements or rack.

For example, in a preferred embodiment, the at least one rack and the at least two propulsion elements can have helical gearing, with the teeth of the helical gearing extending at a helix angle α. The phase displacement with which the at least two propulsion elements enter and exit the rack is realized via the helical gearing. In this preferred embodiment, the at least two propulsion elements can be configured identically or structurally identically and can have corresponding helical gearing to the rack, as a result of which phase displacement occurs and, in addition, a line contact can bring about acoustic optimization from the surface contact between the propulsion elements and the rack. The following relationship advantageously results for the helical gearing, where a is a helix angle of the helical gearing, y is the distance from the geometric center in the transverse axis between the at least two propulsion elements, k is the number of propulsion elements, and x is the distance between two teeth of the rack, where the following applies:

$$\alpha = \arctan\left(\frac{x \cdot \frac{k-1}{k}}{y}\right)$$

Furthermore, it may be advantageous if the helical gearing of the propulsion teeth of the propulsion elements has a slightly different helix angle than the rack, where a helix angle difference is preferably $1° \leq \Delta\alpha \leq 2°$.

According to one embodiment of the present invention, a rack can also be provided for each of the at least two propulsion elements, with the teeth of each rack having in the longitudinal axis an offset that corresponds to the phase shift. The following relationship can preferably result for the offset between the teeth of the particular rack during a cyclical stroke movement of a propulsion tooth (i=1) during one rotation φ of the drive shaft, where Δx is the offset, x is the distance between two teeth of the rack, and k is the number of propulsion elements:

$$\Delta x = \left(\frac{x}{k}\right)$$

The at least two propulsion elements can be designed identically, as a result of which the number of identical parts can be increased.

In one embodiment of the present invention, it is also possible for the at least one propulsion tooth of one of the at least two propulsion elements to be arranged with an offset relative to the at least one propulsion tooth of the other of the at least two propulsion elements in relation to the drive shaft in the longitudinal axis. In this case, the propulsion elements are not identical parts, but have different shapes, determined by the position of the at least one propulsion tooth in the longitudinal axis. The following relationship can preferably result for the offset between the propulsion teeth of the particular propulsion element during a cyclical stroke movement of a propulsion tooth (i=1) during one rotation φ of the drive shaft, where Δx is the offset, x is the distance between two teeth of the rack, and k is the number of propulsion elements:

$$\Delta x = \left(\frac{x}{k}\right)$$

At this point it is noted that the propulsion teeth of the propulsion elements, the teeth of the rack can be offset and/or both the rack and the propulsion elements can have the helical gearing. Consequently, all combinations are possible.

According to a development of the present invention, the at least two propulsion elements have more than one propulsion tooth. For example, it can be advantageous if the at least two propulsion elements have a plurality of propulsion teeth, for example two, three, four, or more, with the respective propulsion teeth not having to have a complete tooth profile. Having a plurality of propulsion teeth on each propulsion element allows the break load to be increased by means of a greater overlap of the linear drive.

According to a development of the present invention, the at least two propulsion elements are arranged transversely to the longitudinal axis and in parallel with one another. The at least two propulsion elements are preferably arranged adjacent to one another by means of a gap that is as small as possible, with the gap ensuring contact-free movement between the at least two propulsion elements.

According to an advantageous development, the at least two propulsion elements each have a recess, with the coupling between the drive shaft and the propulsion element taking place in the recess. The recess preferably pierces at least one of the at least two propulsion elements, preferably the at least two propulsion elements. In this preferred embodiment, the recess extends completely through the propulsion element, it being possible for the recess to be either a clearance hole, a through hole, or an outwardly open groove. The recess preferably forms two side surfaces which are designed to establish a sliding contact with the drive shaft. The two side surfaces are preferably arranged on two diametrical sides. The at least one propulsion tooth of each propulsion element can be arranged—preferably in parallel and spaced apart—on an outer side facing away from the two side surfaces.

According to a further preferred embodiment of the present invention, the drive shaft comprises a camshaft and that the camshaft is coupled to at least two propulsion elements. The camshaft interacts with the at least two propulsion elements and has guide means via which the coupling with the relevant propulsion element can take place. In a preferred embodiment, the camshaft has a camshaft disk for each of the at least two propulsion elements, with the camshaft disk having the guide means which predetermines the cyclical stroke movement during the rotation of the drive shaft of the relevant propulsion element. The at least two camshaft disks are arranged in parallel with one another in the transverse axis and the deflection of each propulsion element is predetermined by the angular position of the relevant camshaft disk. The camshaft preferably contacts at least one of the side surfaces of the recess and forms a drive coupling between the camshaft and the at least one propulsion element.

According to a development of the present invention, it has proven to be advantageous if the at least two camshaft disks are arranged at an angular offset by an angle β about the longitudinal axis. The angle is preferably 0<β<360. For example, in an embodiment of the linear drive with four propulsion elements, the angle can be approximately 90°.

According to a further advantageous embodiment of the present invention, the camshaft disk is designed to be asymmetrical about the longitudinal axis, the camshaft disk also preferably being designed to be mirror-symmetrical about a plane in the longitudinal axis.

In addition, it has proven to be particularly advantageous if the at least one camshaft disk is designed in such a way that the at least one propulsion element is pushed into and out of the rack at a constant angular velocity about the longitudinal axis substantially at a constant speed when the camshaft rotates. In this context, a substantially constant speed of the at least one propulsion element is understood to mean an approximately constant speed between the two turning points at which the at least one propulsion element is either pushed into the rack or pushed out of the rack. Between the two turning points, preferably more than 80%, preferably more than 90%, of the stroke, the speed should be within a tolerance of ±10%, more preferably ±5%, around an average value. At the turning points, the propulsion element is decelerated accordingly and then accelerated again. Such a movement can be described in an X-Y diagram as a zigzag, the stroke being resolved in the X-axis and the revolution angle being resolved in the Y-axis.

Furthermore, it has proven to be advantageous if, according to a development of the present invention, a friction surface of the camshaft disk is formed at a distance from the longitudinal axis in the direction of rotation and in that a change in the distance in at least one first portion increases approximately linearly in a direction of rotation and decreases linearly in the direction of rotation in at least one second portion. The friction surface thus extends approximately in a spiral shape, the friction surface being designed in such a way that the distance between two diametrical sides is approximately constant or corresponds approximately to a width of the recess of the relevant propulsion element. In this embodiment, the camshaft disk is in the shape of a heart, the center of the area moving when it rotates about the longitudinal axis within a plane which lies in the longitudinal axis.

It has also proven to be advantageous if the at least one first portion and the at least one second portion are connected by at least one rounded transition. In particular, it is preferred if, in the transition, the distance between the two diametrical sides of the friction surface is slightly smaller than the width of the recess, as a result of which jamming or tilting of the camshaft disk in the recess is prevented. In particular, it is preferred if the transitions are designed as a transition radius, the transition radius corresponding approximately to the width of the recess, preferably with a tolerance of ±10%.

In a development of the present invention, the first portion and/or the second portion can extend over a semicircle. By means of such an embodiment of the camshaft disk, the propulsion element is pushed into and out of the rack completely once when the camshaft rotates fully about the longitudinal axis, this movement consequently corresponding to a cycle.

According to a further preferred embodiment of the present invention, a width of the recess is selected in such a way that the camshaft disk is encompassed approximately without play. In this case, the recess of the at least one contact element can be lined with appropriate means, through which the camshaft disk can contact the recess with reduced friction or can slide off the side surfaces. For example, the friction between the camshaft disk or the friction surface of the camshaft disk and the side surfaces of the recess can be reduced by selecting appropriate material pairings, it also being possible to use lubricants to reduce the friction.

Furthermore, it has proven to be advantageous if a height of the recess corresponds at least to the width of the recess. In particular, it is preferred if the height is greater than the width of the recess, as a result of which the at least one transverse surface connecting the side surfaces does not come into contact with the camshaft disk.

In addition, it has proven to be advantageous if the at least one propulsion tooth of each of the two at least two propulsion elements and/or the teeth of the rack are designed to be symmetrical and to correspond.

According to a preferred development, a carriage is provided. The carriage preferably comprises one or more housing parts, the drive shaft and/or the at least two propulsion teeth preferably being supported in the carriage by bearings. The carriage preferably comprises a housing which accommodates the propulsion teeth and which can be assembled from a plurality of housing parts. At least one bearing can be provided in the carriage for the mounting of the drive shaft, which bearing can be designed, for example, as a slide bearing or rolling bearing. The carriage can be firmly coupled to an upper rail of the longitudinal seat adjustment device.

According to a preferred development of the present invention, the carriage comprises at least one linear guide means by which the at least two propulsion elements are held so as to be linearly guided in the stroke axis. In addition, forces in the longitudinal axis are transmitted via the linear guide means between the carriage and the at least two propulsion elements.

According to a preferred development, the linear guide means have a contact surface, the contact surface preferably being flat, concave, or convex and each propulsion element being mounted in a form-fitting manner within the carriage in both the longitudinal axis and in the transverse axis. Consequently, each of the at least two propulsion elements can only move in the stroke axis.

According to a preferred development, a drive is provided wherein the drive drives the drive shaft. The drive is preferably an electric drive, which is even more preferably coupled to the drive shaft via a gear unit, in particular a planetary gearset.

A further aspect of the present invention relates to a longitudinal seat adjustment device having at least one above-described linear drive. The longitudinal seat adjustment device preferably comprises a lower rail that can be fixed to a chassis and an upper rail, the upper rail being even more preferably motorized by means of the linear drive. In a preferred embodiment, the lower rail can also comprise the rack and the upper rail can comprise the remaining components of the linear drive, in particular the propulsion elements and the drive shaft.

A third and last aspect of the present invention relates to a motor vehicle having at least one longitudinal seat adjustment device.

BRIEF DESCRIPTION OF THE DRAWINGS

Three exemplary embodiments of the present invention are described in detail below with reference to the accompanying drawings, in which.

DETAILED DESCRIPTION OF THE PREFERRED EMBODIMENTS

Identical or functionally identical components in an exemplary embodiment are identified below with the same reference symbols. For the sake of clarity, not all parts that are the same or functionally the same in the individual figures are provided with a reference number.

Figure 1:
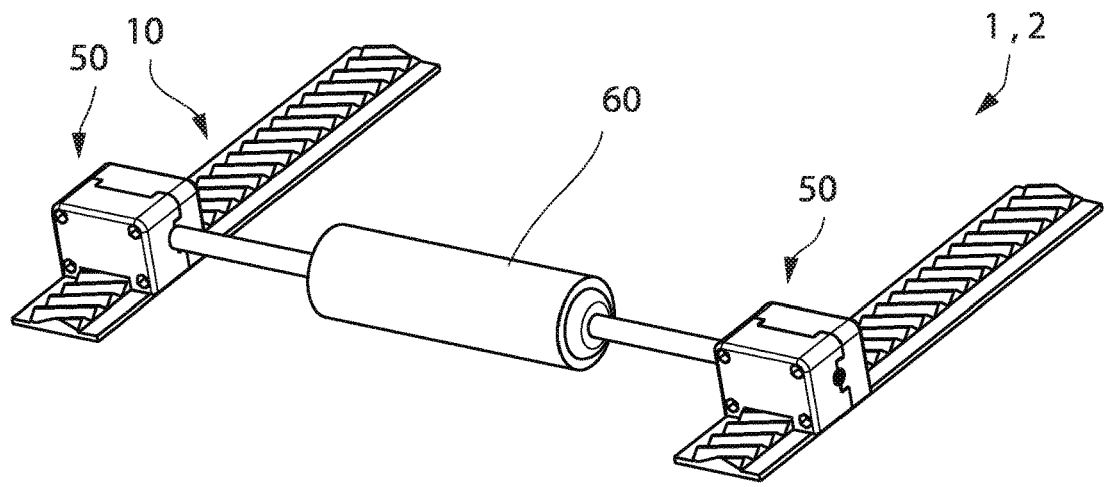
FIG. 1 is a greatly simplified perspective representation of a longitudinal seat adjustment device having a linear drive.
Figure 2:
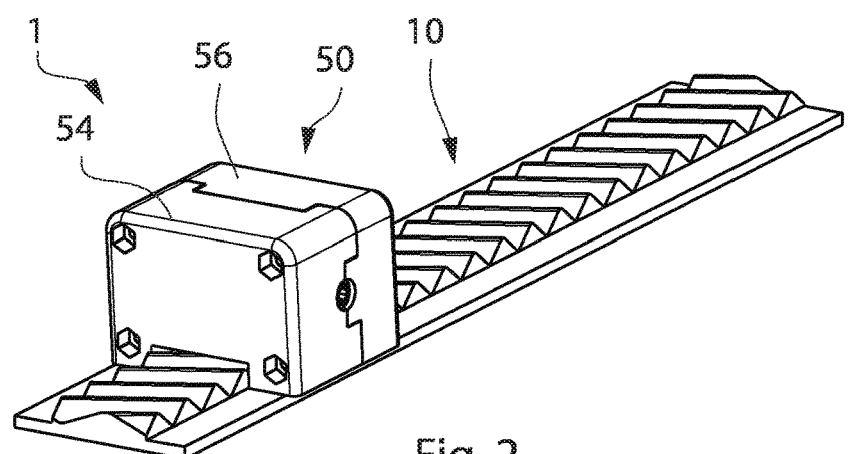
FIG. 2 is an enlarged perspective representation of the linear drive having a rack oriented in a longitudinal axis, four propulsion elements, a drive shaft, and a carriage accommodating the propulsion elements according to FIG. 1.

FIG. 1 shows a longitudinal seat adjustment device 2 according to the invention of a motor vehicle 3 (not shown) having a linear drive 1 which is designed to adjust a seat (not shown) of the motor vehicle 3 in a longitudinal axis X.

The longitudinal seat adjustment device 2 can have a lower rail (not shown), the lower rail being connected to a chassis (not shown), and can have an upper rail (not shown) having the seat, the upper rail being movable relative to the lower rail in the longitudinal axis X.

The linear drive 1, which is shown in detail in three different exemplary embodiments in FIGS. 3-13, comprises at least one rack 10, a drive shaft 20, and at least two propulsion elements 30.

Furthermore, the linear drive 1 can comprise a carriage 50 which can support the propulsion elements 30 and the drive shaft 20 by means of bearings. The carriage 50 can be formed from two housing parts 54, 56 which can be joined together in a plane perpendicular to the longitudinal axis X.

The at least one rack 10 is arranged along the longitudinal axis X and has a plurality of teeth 15 which are lined up in the longitudinal axis X, preferably equidistantly. The teeth 15 can have a symmetrical tooth profile with two contact surfaces 18 formed on the flanks and a tooth space 16 formed between the teeth.

The drive shaft 20 can be driven by a drive 60, with a gear unit 65 preferably being provided between the drive 60 and the drive shaft 20, by means of which gear unit a desired step-up or step-down ratio can be brought about. The drive shaft 20 is arranged in a transverse axis Y perpendicularly to the longitudinal axis X, with the transverse axis Y and the longitudinal axis X being able to span a plane which is arranged in parallel with the rack 10.

In the exemplary embodiments described below by way of example, the linear drive 1 has four propulsion elements 30 in each case. Each propulsion element 30 comprises at least one propulsion tooth 35 and is linearly movable in a stroke axis Z which is oriented transversely to the longitudinal axis X and transversely to the drive shaft 20 or the transverse axis Y.

Each propulsion element 30 can be linearly guided in the carriage 50 by linear guide means 52 in the stroke axis Z, said guide means predetermining the position of each propulsion element 30 in the transverse axis Y and longitudinal axis X. The linear guide means 52 can, for example, support each propulsion element 30 in a V-shaped or U-shaped manner, by bearing on bearing surfaces 32 in the front end region and/or in a rear end region.

Figure 4:
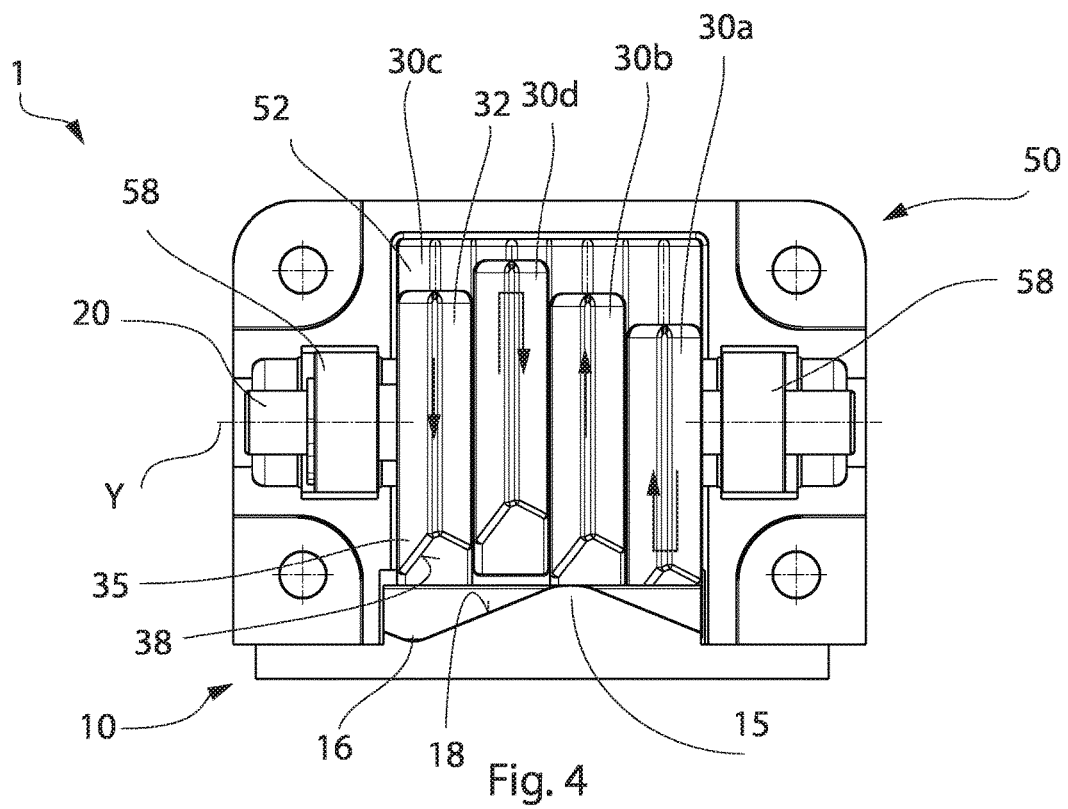
FIG. 4 is a sectional view in a plane transverse to the longitudinal axis.
Figure 8:
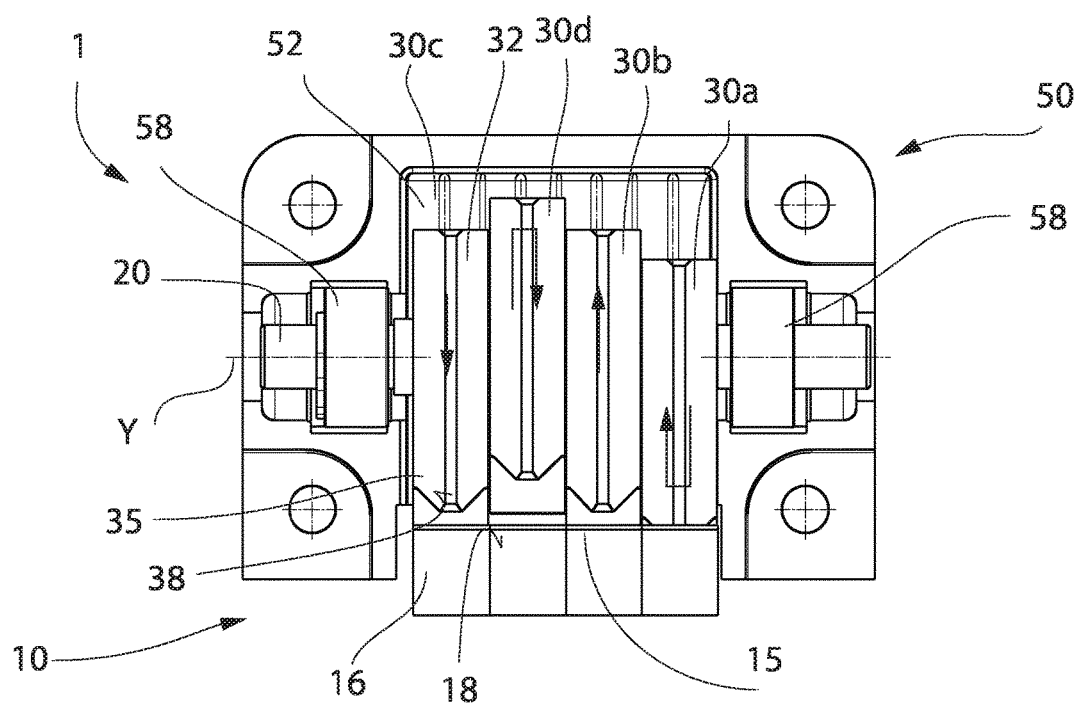
FIG. 8 is a sectional view of the linear drive having the carriage according to FIG. 6 in a plane transverse to the longitudinal axis.
Figure 12:
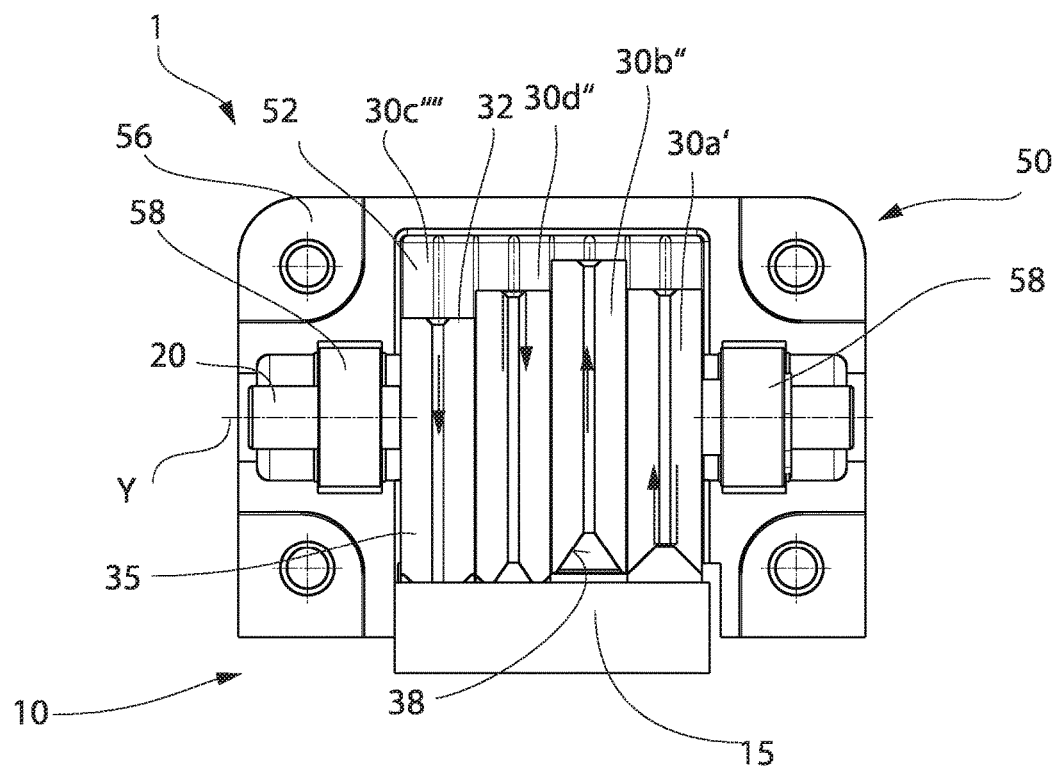
FIG. 12 is a sectional view of the linear drive according to the third exemplary embodiment having the carriage in a plane transverse to the longitudinal axis.

The at least one propulsion tooth 35 is designed to correspond to the teeth 15 of the rack 10 and can have a symmetrical tooth profile with two contact surfaces 38 formed on the flanks. For better understanding, the reference numerals with the suf-fixes a, b, c, and d are added for the four propulsion elements 30 in the figures below in order to identify the different movements during the cyclical stroke movement. The movements are also indicated in FIGS. 4, 8, 12 by means of arrow lines.

Figure 3:
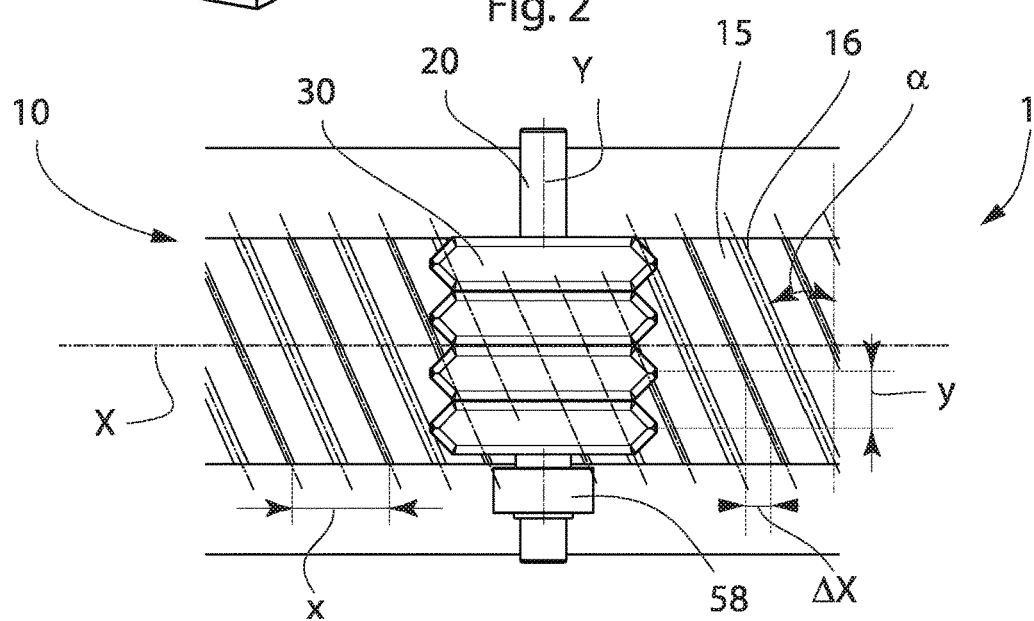
FIG. 3 is a simplified representation of the linear drive according to FIGS. 1 and 2, with the carriage being omitted for better understanding.

It can be seen from FIG. 3 that the propulsion elements 30 are arranged transversely to the longitudinal axis X, specifically in the transverse axis Y, parallel and next to or adjacent to one another.

The propulsion elements 30 are drivingly coupled to the drive shaft 20, as a result of which a rotational movement of the drive shaft 20 results in or is converted into a cyclical translational movement in the stroke axis Z. In the course of one rotation φ of the drive shaft 20, each propulsion element 30 performs at least one cyclical movement and, during the cyclical movement, enters and exits the at least one rack 10 to generate propulsion in the longitudinal axis X. This cyclical stroke movement can be described, for example, as one complete period of a sine curve, each propulsion element 30 entering the rack 10 or a tooth space 16 once, fully exiting once, and returning to the initial position within one cyclical stroke movement. However, within the meaning of this invention, it is also possible for each propulsion element 30 to perform a plurality of cyclical stroke movements during one rotation φ.

Figure 5:
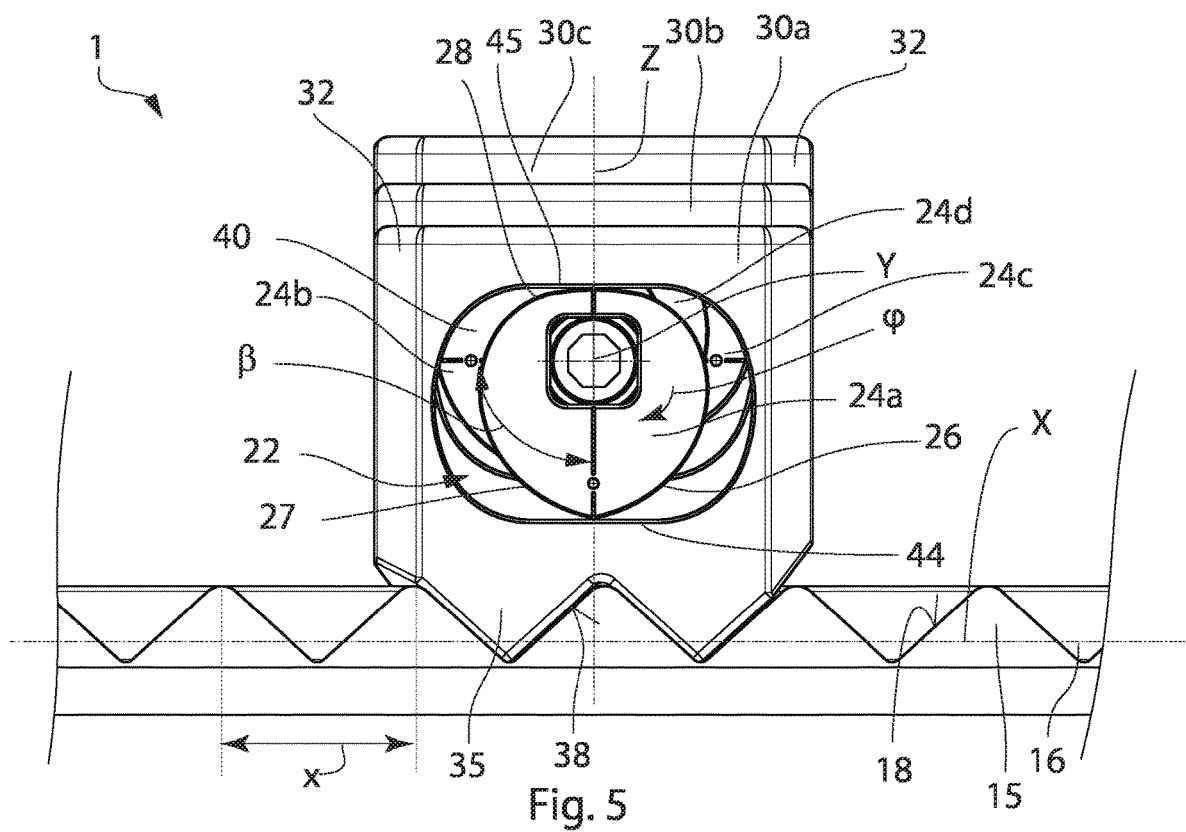
FIG. 5 is a simplified sectional view of the linear drive according to FIG. 3.
Figure 6:
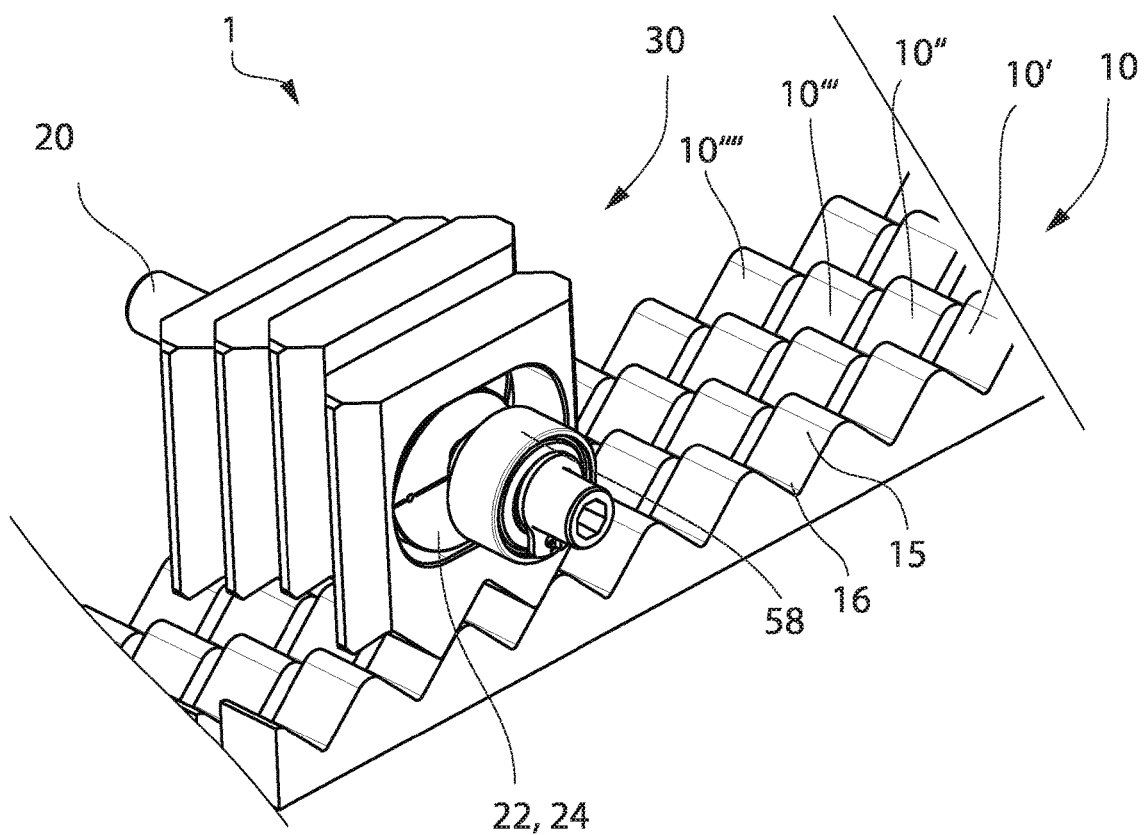
FIG. 6 is a simplified perspective representation of a linear drive according to a second exemplary embodiment, with the carriage being omitted for better understanding.

The cyclical stroke movement of the at least two propulsion elements 30 takes place with a phase shift Δφ, as a result of which the propulsion elements 30 enter or exit the rack 10 in different angular positions of the drive shaft 20. Referring to FIGS. 4 and 5, it can be seen that the propulsion elements 30a, 30b, 30c, 30d enter and exit a tooth space 16 of the rack 10 at different times when the drive shaft 20 is rotating at a constant speed. The propulsion element 30a has fully entered the rack and is at the turning point. The propulsion element 30d has fully exited the rack and is also at the turning point. The propulsion element 30b is in the cyclical stroke movement while exiting and the propulsion element 30b is in the cyclical stroke movement while entering the rack 10. In FIG. 5, these movements are indicated by means of arrow lines.

The driving coupling between the drive shaft 20 and each propulsion element is brought about by guide means, it being possible for the guide means to be in operative contact with each propulsion element 30. The guide means preferably has a friction surface which interacts with a corresponding friction surface of the propulsion element 30, the friction surface of the drive shaft 20 predetermining the position of the propulsion element 30 in the vertical axis Z. For this purpose, the corresponding friction surfaces can slide off one another, with the propulsion element 30 being deflected during the sliding motion in order to enter or exit the rack.

Referring to FIG. 5, an exemplary embodiment of the coupling between the drive shaft 20 and the relevant propulsion element 30 is shown, it being evident that the drive shaft 20 comprises a camshaft and each propulsion element 30 has a recess 40.

The camshaft 22 can be formed by a plurality of camshaft disks 24, with each propulsion element 30 preferably being assigned a camshaft disk 24. Each camshaft disk 24 is arranged for conjoint rotation with the drive shaft 20 and for mutual rotation about the transverse axis Y at an angle β. As a result, the phase shift can be realized in the cyclical stroke movement of the respective propulsion elements. In the exemplary embodiments shown, which each have propulsion elements 30, the angle β can be 90°.

According to what is shown in FIGS. 3 and 4, the drive shaft 20 passes through the propulsion elements 30 in the recess 40 and can be supported laterally, preferably on both sides of the propulsion elements 30, by bearings 58.

Figure 13:
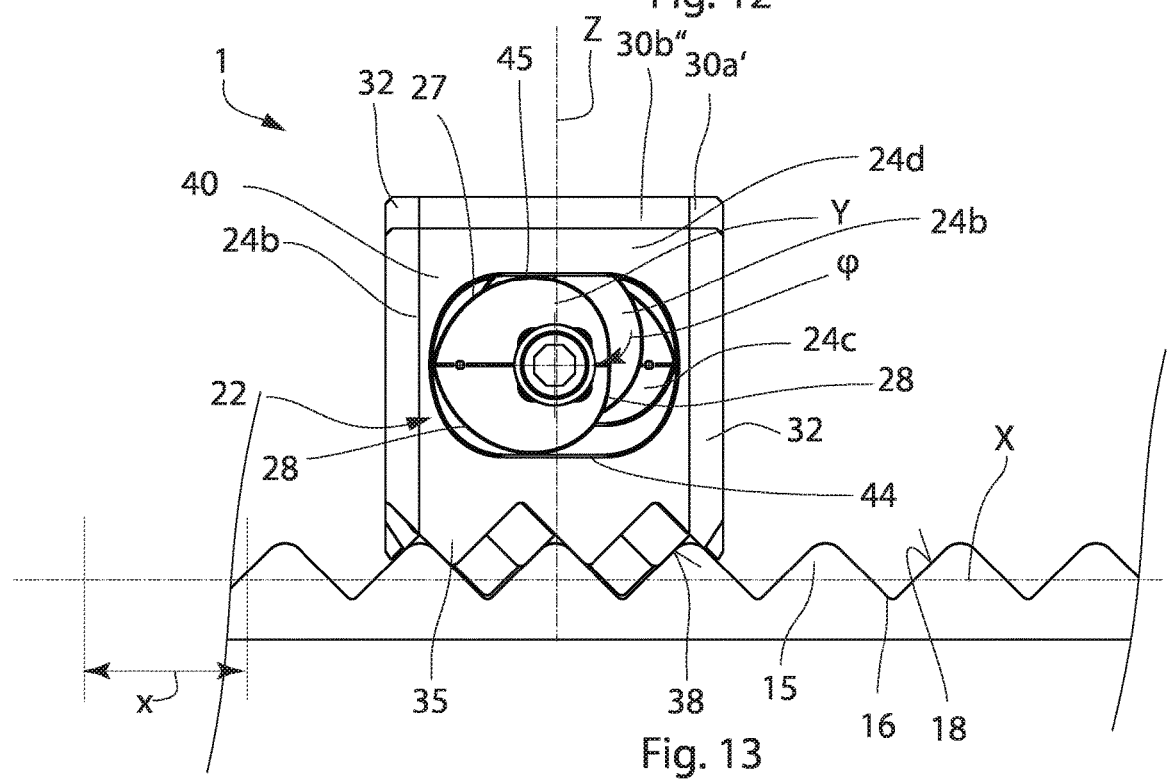
FIG. 13 is a simplified side view of the linear drive according to the third exemplary embodiment.

The recess 40—see also FIG. 13—can be designed in the manner of a through opening or through hole. The recess 40 has a maximum width B in the longitudinal axis X and a height H in a stroke axis Z. In the longitudinal axis X, the recess 40 is framed by two side surfaces 42, 43 and in the stroke axis Z by two longitudinal surfaces 44, 45. The height H is preferably at least as great as the width B and more preferably the height H is greater than the width B, i.e., H≥B.

The driving coupling between the drive shaft 20 or the camshaft 22 and the propulsion element 30 takes place in the recess 40 by an operative contact between the friction surfaces of the camshaft disk 24 and the longitudinal surfaces 44, 45 of the recess 40. By means of the coupling between the camshaft 22 and the relevant propulsion element 30, the propulsion element 30 can be pushed into and back out of the rack 10, without having to provide separate return means for this purpose. For pushing in, a force is applied by the camshaft disk 24 to the longitudinal surfaces 44 facing the rack 10 and for pushing out, a force is applied to the longitudinal surfaces 45 facing away from the rack 10.

The camshaft disk 24 is designed in such a way that, when the drive shaft 20 rotates at a constant angular speed, the at least one propulsion element 30 is pushed into and out of the rack 10 at a substantially constant speed. This produces a movement of each propulsion element 30 in the stroke axis Z that is as linear or constant as possible.

More specifically, the camshaft disk 24 is heart-shaped in the illustrated exemplary embodiment and has a first portion 26 and a second portion 27, each of which extends over a semicircle. The first portion 26 and the second portion 27 are mirror-symmetrical and have approximately the profile of a spiral. The spiral-shaped profile of each portion 26, 27 is selected in such a way that the distance between the transverse axis Y and the friction surface changes approximately constantly in a direction of rotation as the revolution angle of the camshaft disk 24 increases. With a constant rotation of the camshaft disk 24, the radius increases linearly with the rotation in the first portion 26 and the radius decreases linearly in the second portion 27. Furthermore, the radius of the two portions 26, 27 is selected in such a way that the distance between two diametrical sides of the friction surface corresponds approximately to the width B of the recess 40. As a result, when the camshaft disk 24 rotates, a center of the area of the camshaft disk 24 travels exactly in parallel with the longitudinal axis X in the transverse direction Y.

A transition 28 connecting the spiral-shaped profiles is formed between the first portion 26 and the second portion 27 in each case. The transition 28 is formed in the manner of a transition radius and, in a preferred and illustrated embodiment, can correspond approximately to the width B of the recess 40. In order to avoid wedging or jamming of the camshaft disk 24 in the recess 40, the transitions 28 can be selected in such a way that the distance between the two opposite diametrically formed transitions 28 is at least 90%, preferably more than 95%, of the width H of the recess 40.

In order to generate a corresponding propulsion when the relevant propulsion element 30 is pushed into the rack 10 or the tooth space 16 thereof, the respective contact surfaces 18, 38 of the rack 10 and the propulsion element 30 or the propulsion tooth 35 must mesh with one another in the longitudinal axis X with an offset, where the offset ΔX is directly correlated with the phase shift Δφ.

The offset ΔX— see FIG. 3—according to the exemplary embodiment in FIGS. 3-6 is accomplished by a helical gearing with a helix angle α.

The propulsion teeth 35 are all identical and also have helical gearing that corresponds to the helical gearing of the rack 10. The helix angle α of the helical gearing is predetermined by the dimensioning and number of the propulsion elements 30, where y is the distance from the geometric center in the transverse axis Y between the at least two propulsion elements 30, k is the number of propulsion elements 30, and x is the distance between two teeth 15 of the rack 10 in the longitudinal axis X:

$$\alpha = \arctan\left(\frac{x \cdot \frac{k-1}{k}}{y}\right)$$

The following relationship results for the offset ΔX between the respective propulsion elements 30 resulting from the helical gearing, where x is the distance between two teeth 15 of the rack 10 and k is the number of propulsion elements or n is the fraction of the phase shift:

$$\Delta X = xk \text{ or } \Delta X = xn$$

The offset ΔX is related to the geometric center in the transverse axis Y of the relevant tooth 15 according to FIG. 3.

In the second exemplary embodiment according to FIGS. 6-9, the offset ΔX is accomplished by a plurality of racks 10, with each propulsion element 30 being assigned a rack 10', 10'', 10''', and 10'''' which the relevant propulsion element 30 can enter and exit. The racks 10', 10'', 10''', and 10'''' can be designed as individual parts or as an integral component.

The propulsion teeth 35 and the teeth 15 of the racks 10', 10'', 10''', and 10'''' have spur teeth. Otherwise, the structure and function of the linear gear unit 1 corresponds to the first exemplary embodiment.

Figure 7:
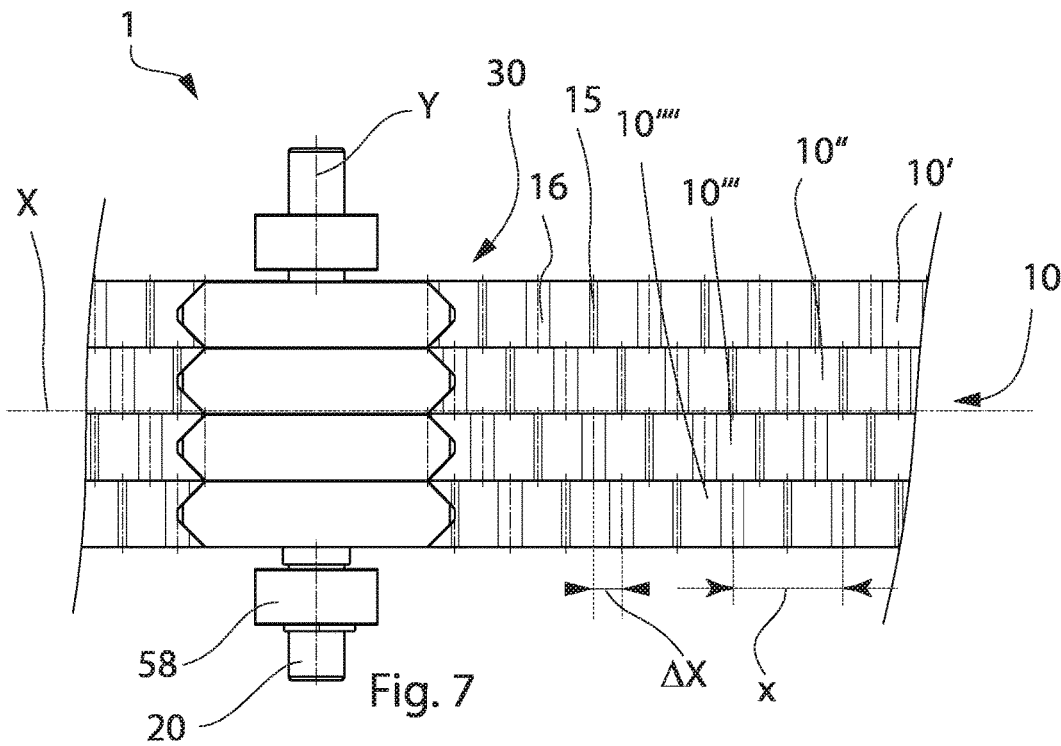
FIG. 7 is a top view of the linear drive according to FIG. 6.
Figure 9:
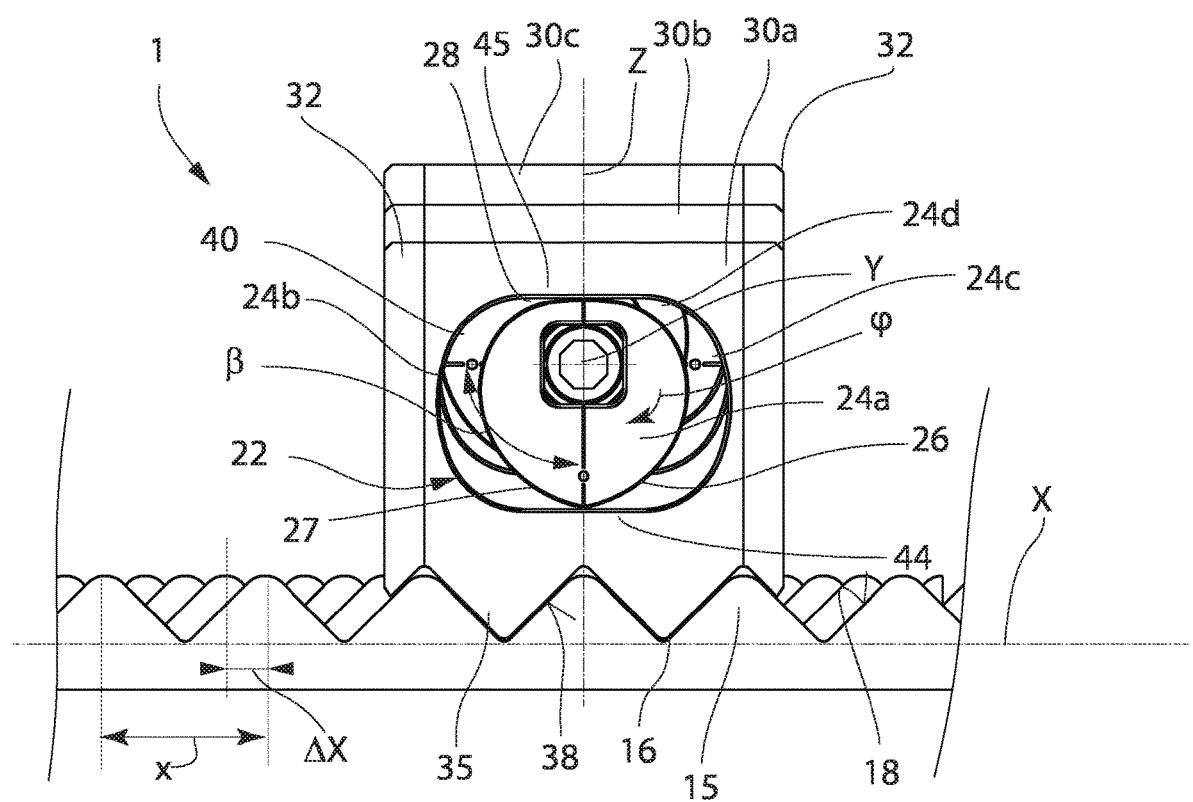
FIG. 9 is a simplified side view of the linear drive according to the second exemplary embodiment.
Figure 10:
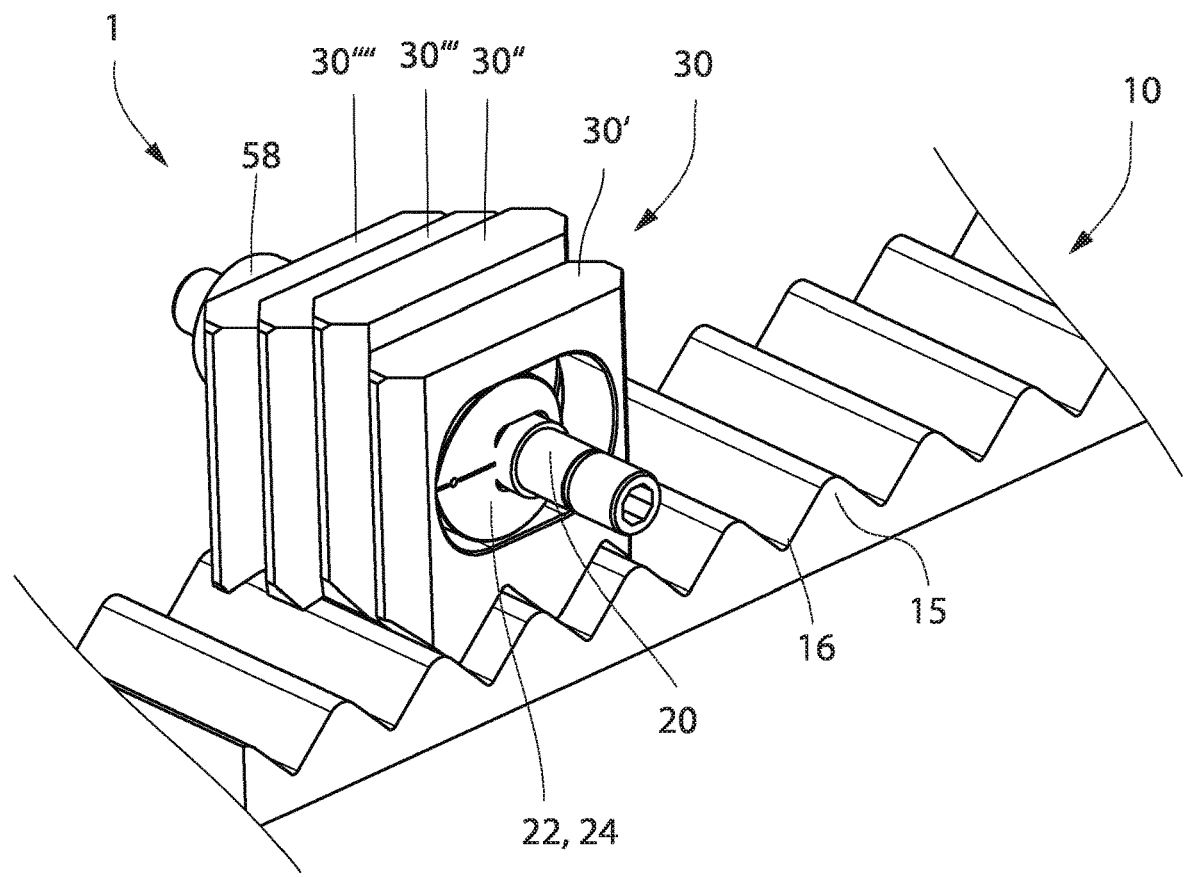
FIG. 10 is a simplified perspective representation of a linear drive according to a third exemplary embodiment, with the carriage being omitted for better understanding.

The offset ΔX between the teeth 15 of the racks 10', 10", 10''', and 10'''' in the longitudinal axis X according to FIGS. 7 and 9 can be described by the following relationship, where x is the distance between two teeth 15 of the rack 10 and k is the number of propulsion elements or n is the fraction of the phase shift:

$\Delta X = xk$ or $\Delta X = xn$

Figure 11:
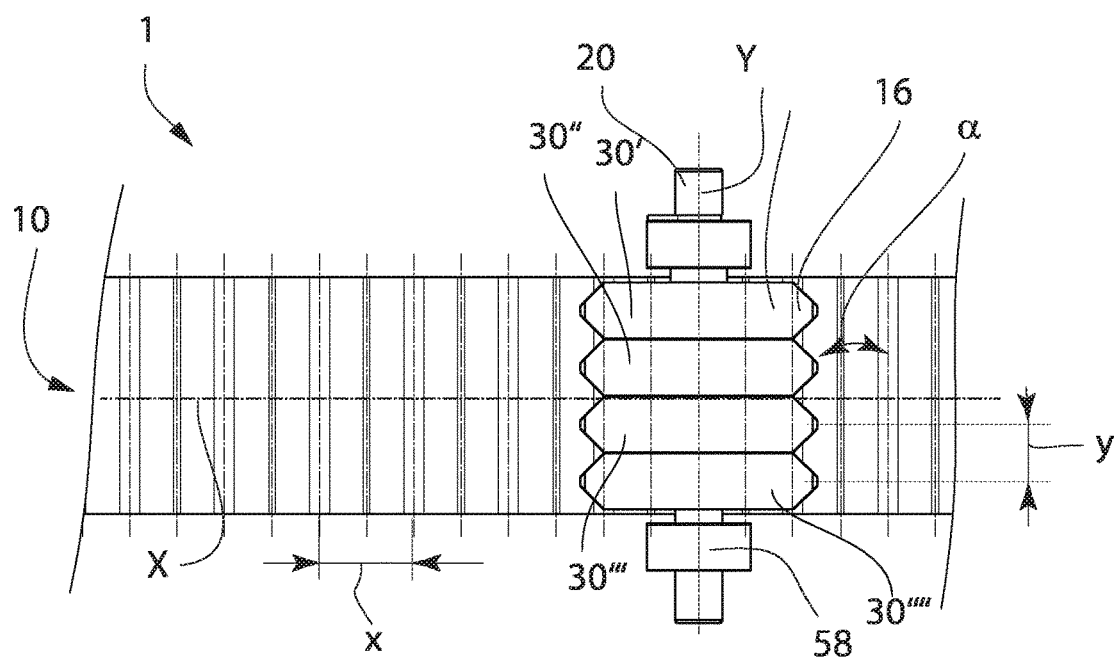
FIG. 11 is a top view of the linear drive according to FIG. 10.

The third exemplary embodiment according to FIGS. 10-14 is characterized in that the rack 10, as can be seen from FIGS. 11 and 13, has spur teeth which are continuous in the transverse axis Y. The offset ΔX is accomplished by differently configured propulsion elements 30, which are identified in the figures with the reference signs 30', 30", 30''', 30''''.

Figure 14:
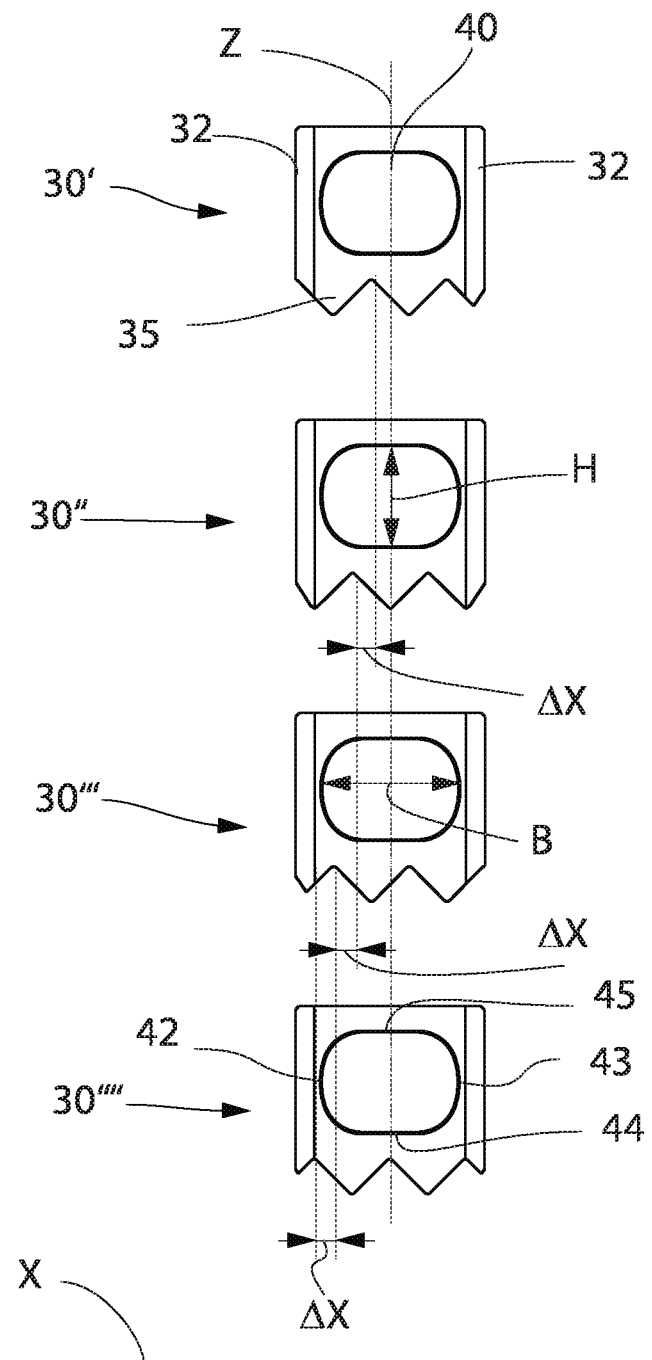
FIG. 14 shows four detailed representations of the different propulsion elements of the linear drive according to the third exemplary embodiment.

Referring to the accompanying FIG. 14, it can be seen that, from propulsion element 30', 30", 30''', 30'''' to propulsion element 30', 30", 30''', 30'''', there is an offset between the propulsion teeth 35 in the transverse axis Y. The offset ΔX between the propulsion teeth 35 of the propulsion elements 30', 30", 30''', 30'''' in the longitudinal axis X according to FIG. 14 can be described by the following relationship, where x is the distance between two teeth 15 of the rack 10 and k is the number of propulsion elements 30 or n is the fraction of the phase shift:

$\Delta X = xk$ or $\Delta X = xn$

Otherwise, the structure of the linear drive 1 according to the third exemplary embodiment corresponds to the linear drive 1 according to the first exemplary embodiment, which was described in detail above.

At this point, for the sake of completeness, it is noted that combinations of these three exemplary embodiments are possible.

List of Reference Signs

| | |
|---|---|
| 1 | Linear drive |
| 2 | Longitudinal seat adjustment device |
| 3 | Motor vehicle |
| 10 | Rack |
| 15 | Tooth |
| 16 | Tooth space |
| 18 | Contact surface |
| 20 | Drive shaft |
| 22 | Camshaft |
| 24 | Camshaft disk |
| 26 | First portion |
| 27 | Second portion |
| 28 | Transition |
| 30 | Propulsion element |
| 32 | Bearing surface |
| 35 | Propulsion tooth |
| 38 | Contact surface |
| 40 | Recess |
| 42 | Side surface |
| 43 | Side surface |
| 44 | Longitudinal surfaces |
| 45 | Longitudinal surface |
| 50 | Carriage |
| 52 | Linear guide means |
| 54 | Housing part |
| 56 | Housing part |
| 58 | Bearing |
| 60 | Drive |
| 65 | Gear unit |
| i | Number of cyclical stroke movements of a propulsion element during one rotation of the drive shaft |
| k | Number of propulsion elements 30 |
| n | Fraction of the phase shift |
| x | Distance between two teeth 15/35 |
| y | Distance |
| X | Longitudinal axis |

List of Reference Signs (continued)

| | |
|---|---|
| Y | Transverse axis |
| Z | Stroke axis |
| ΔX | Offset |
| α | Helix angle |
| β | Tooth flank angle |
| φ | Rotation |
| Δφ | Phase shift |

The invention claimed is:

1. A linear drive (1), comprising:
    at least one rack (10) which is arranged along a longitudinal axis (X) and has a plurality of teeth (15);
    a drive shaft (20) arranged in a transverse axis (Y) transversely to the longitudinal axis (X); and
    at least two propulsion elements (30), each having at least one propulsion tooth (35),
    wherein the at least two propulsion elements (30) are linearly movable in a stroke axis (Z) which is oriented transversely to the longitudinal axis (X) and transversely to the drive shaft (20),
    wherein the at least two propulsion elements (30) are drivingly coupled to the drive shaft (20) in such a manner that the at least two propulsion elements (30) perform at least one cyclical stroke movement in the course of one rotation (φ) of the drive shaft (20) and enter and exit the at least one rack (10) to generate a propulsion in the longitudinal axis (X), and
    wherein the at least two propulsion elements (30) enter and exit the at least one rack (10) with a phase shift (Δφ).

2. The linear drive (1) according to claim 1, characterized in that the following applies to the phase shift (Δφ) of the cyclical stroke movement of the at least two propulsion elements (30) in relation to a rotation (φ) of the drive shaft (20): $\frac{1}{16}\varphi \le \Delta\varphi \le \frac{1}{2}\varphi$.

3. The linear drive (1) according to claim 1, characterized in that the at least one propulsion tooth (35) of one of the at least two propulsion elements (30) is arranged with an offset (ΔX) relative to the at least one propulsion tooth (35) of the other of the at least two propulsion elements (30) in relation to the drive shaft (20) in the longitudinal axis (X) and/or in that the at least one tooth (15) of the at least one rack (10) can enter and exit one of the at least two propulsion elements (30) and is arranged with an offset (ΔX) in the longitudinal axis (X) relative to the at least one tooth (15) of the at least one rack (10), which the other of the at least two propulsion elements (30) enter and exit.

4. The linear drive (1) according to claim 1, characterized in that the at least one rack (10) and the at least two propulsion elements (30) have helical gearing at a helix angle (α).

5. The linear drive (1) according to claim 1, characterized in that a rack (10) is provided for each of the at least two propulsion elements (30), the teeth (15) of each rack (10) having in the longitudinal axis (X) an offset (ΔX) that corresponds to the phase shift (Δφ).

6. The linear drive (1) according to claim 1, characterized in that the at least two propulsion elements (30) have more than one propulsion tooth (35).

7. The linear drive (1) according to claim 1, characterized in that the at least two propulsion elements (30) are identical.

8. The linear drive (1) according to claim 1, characterized in that the at least two propulsion elements (30) are arranged in parallel and adjacent to one another transversely to the longitudinal axis (X).

9. The linear drive (1) according to claim 1, characterized in that the at least two propulsion elements (30) each have a recess (40) and in that the drive shaft (20) is drivingly coupled to the relevant propulsion element (30) in the recess (40).

10. The linear drive (1) according to claim 1, characterized in that the drive shaft (20) comprises a camshaft (22) and in that the drive shaft (20) is drivingly coupled to the at least two propulsion elements (30) via the camshaft (22).

11. The linear drive (1) according to claim 1, characterized in that a camshaft (22) comprises at least two camshaft disks (24) which are arranged in parallel and spaced apart transversely to the longitudinal axis (X).

12. The linear drive (1) according to claim 11, characterized in that the at least two camshaft disks (24) are arranged at an angular offset at an angle ($\beta$) about the longitudinal axis (X).

13. The linear drive (1) according to claim 11, characterized in that the at least two camshaft disks (24) are arranged asymmetrically about the longitudinal axis (X).

14. The linear drive (1) according to claim 11, characterized in that the at least two camshaft disks (24) are designed in such a way that, when the drive shaft (20) rotates at a constant angular speed, the at least two propulsion elements (30) are pushed into and out of the rack (10) at a substantially constant speed.

15. The linear drive (1) according to claim 11, characterized in that the at least two camshaft disks (24) have guide means which predetermines the cyclical stroke movement during the rotation ($\varphi$) of the drive shaft (20).

16. The linear drive (1) according to claim 15, characterized in that the guide means is formed on the at least two camshaft disks (24) at a distance (A) from the transverse axis (Y) in the direction of rotation and in that the change in the distance (A) in at least one first portion (26) increases approximately linearly in the direction of rotation and decreases linearly in the direction of rotation in at least one second portion (27).

17. The linear drive (1) according to claim 1, characterized in that the at least one first portion (26) and the at least one second portion (27) are connected by rounded transitions (28).

18. The linear drive (1) according to claim 1, characterized in that a first portion (26) extends over a first semicircle and a second portion (27) extends over a second semicircle.

19. The linear drive (1) according to claim 1, characterized in that a width (B) of a recess (40) is selected in such a way that a camshaft disk (24) is encompassed without play.

20. The linear drive (1) according to claim 1, characterized in that a height (H) of a recess (40) is selected in such a way that a camshaft disk (24) is contact-free.

21. The linear drive (1) according to claim 1, characterized in that each propulsion tooth (35) and each one of the plurality of teeth (15) are designed to be symmetrical and to correspond with one another.

22. The linear drive (1) according to claim 1, characterized in that a carriage (50) is provided, and in that the drive shaft (20) is provided in the carriage and the at least two propulsion teeth are supported by bearings.

23. The linear drive (1) according to claim 22, characterized in that the carriage (50) has at least one linear guide means (52) by which the at least two propulsion elements (30) are linearly guided in the stroke axis (Z).

24. The linear drive (1) according to claim 1, characterized in that a drive (60) is provided, wherein the drive (60) drives the drive shaft (20).

25. A longitudinal seat adjustment device (2) having a linear drive (1) according to claim 1.

26. A motor vehicle (3) having a linear drive (1) according to claim 1.

* * * * *